Patented Nov. 24, 1925.

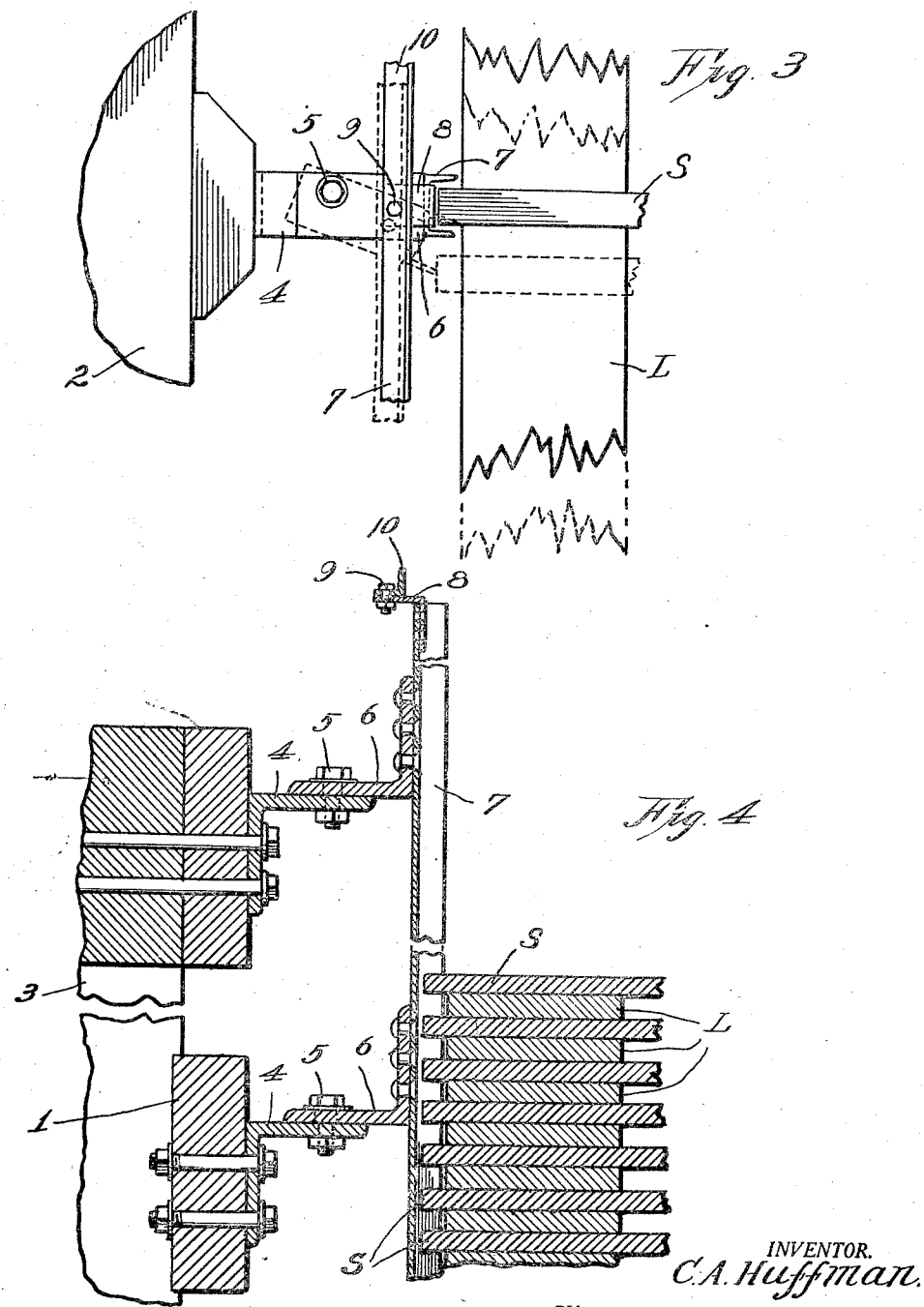

1,563,030

UNITED STATES PATENT OFFICE.

CHARLES A. HUFFMAN, OF LONGVIEW, WASHINGTON, ASSIGNOR TO THE LONG-BELL LUMBER COMPANY, OF LONGVIEW, WASHINGTON, A CORPORATION OF MISSOURI.

AUTOMATIC STICK GUIDE.

Application filed May 26, 1925. Serial No. 32,931.

*To all whom it may concern:*

Be it known that I, CHARLES A. HUFFMAN, a citizen of the United States, and a resident of Longview, county of Cowlitz, State of Washington, have invented a certain new and useful Improvement in Automatic Stick Guides, of which the following is a complete specification.

This invention relates to stick guides for use in the spacing of lumber which is to be run into a kiln for drying purposes. As is well known, it is desirable that the sticks spacing the layers of lumber undergoing drying in a kiln should be placed in exact vertical alinement so that each board will be properly spaced and no particular layer be subjected to uneven strain leading to warping or twisting of the lumber.

One of the objects of the present invention is to produce a stick guide which shall accurately and reliably place the sticks in vertical alinement on the truck or car, and which is automatic in its operation inasmuch as the guides may be disengaged from the ends of the sticks merely by propelling the truck into the kiln.

Another object is to produce a stick guide of the character mentioned which is of strong, durable, efficient and inexpensive construction; and in order that it may be fully understood, reference is to be had to the accompanying drawing, in which:—

Figure 3 is an enlarged top plan view of one of the vertical stick guides cooperating with a spacing stick, the side or release position of the guide being indicated in dotted lines.

Figure 4 is an enlarged vertical section taken on the line IV—IV of Figure 2.

Figure 1:
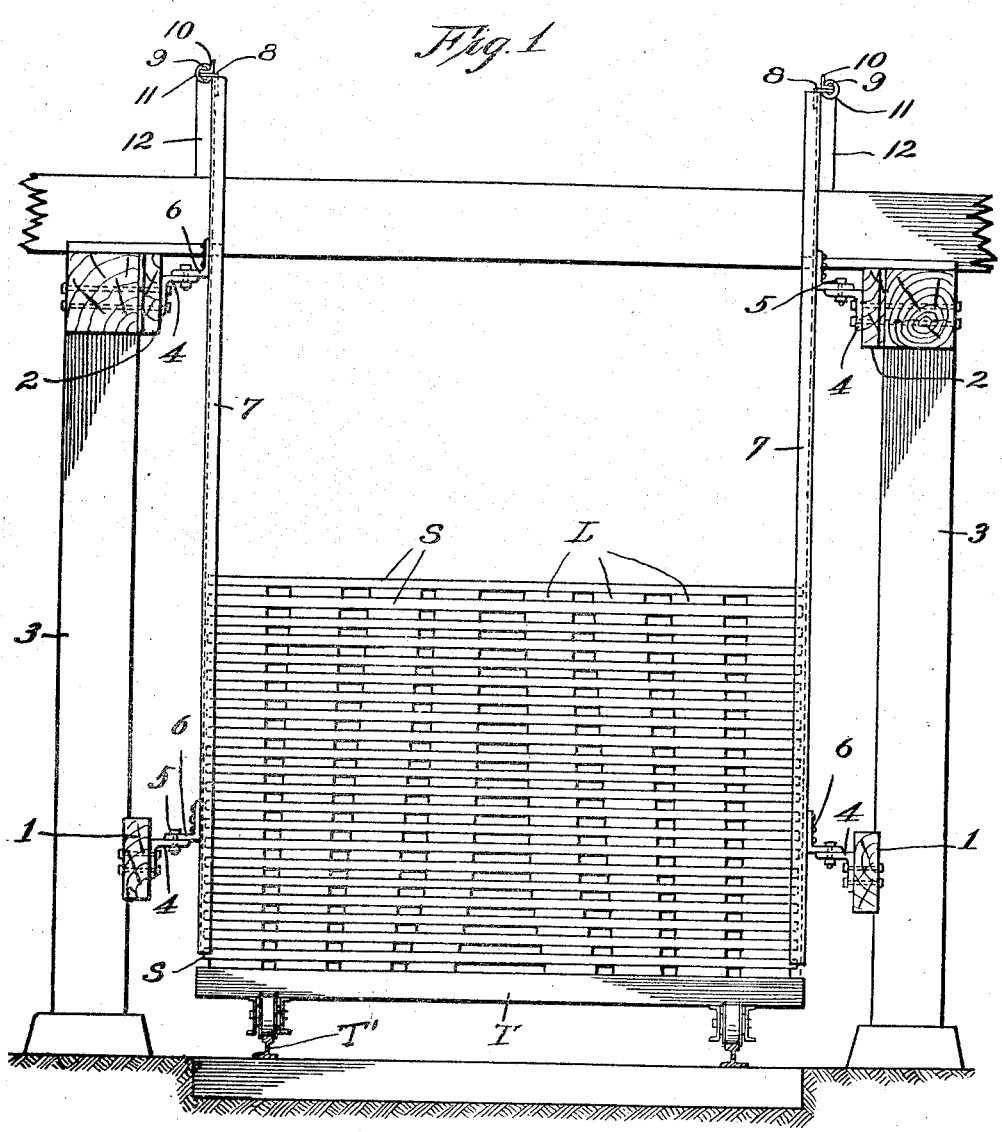
Figure 1 is an end elevation illustrating a partially loaded truck and automatic stick guides embodying the invention.
Figure 2:
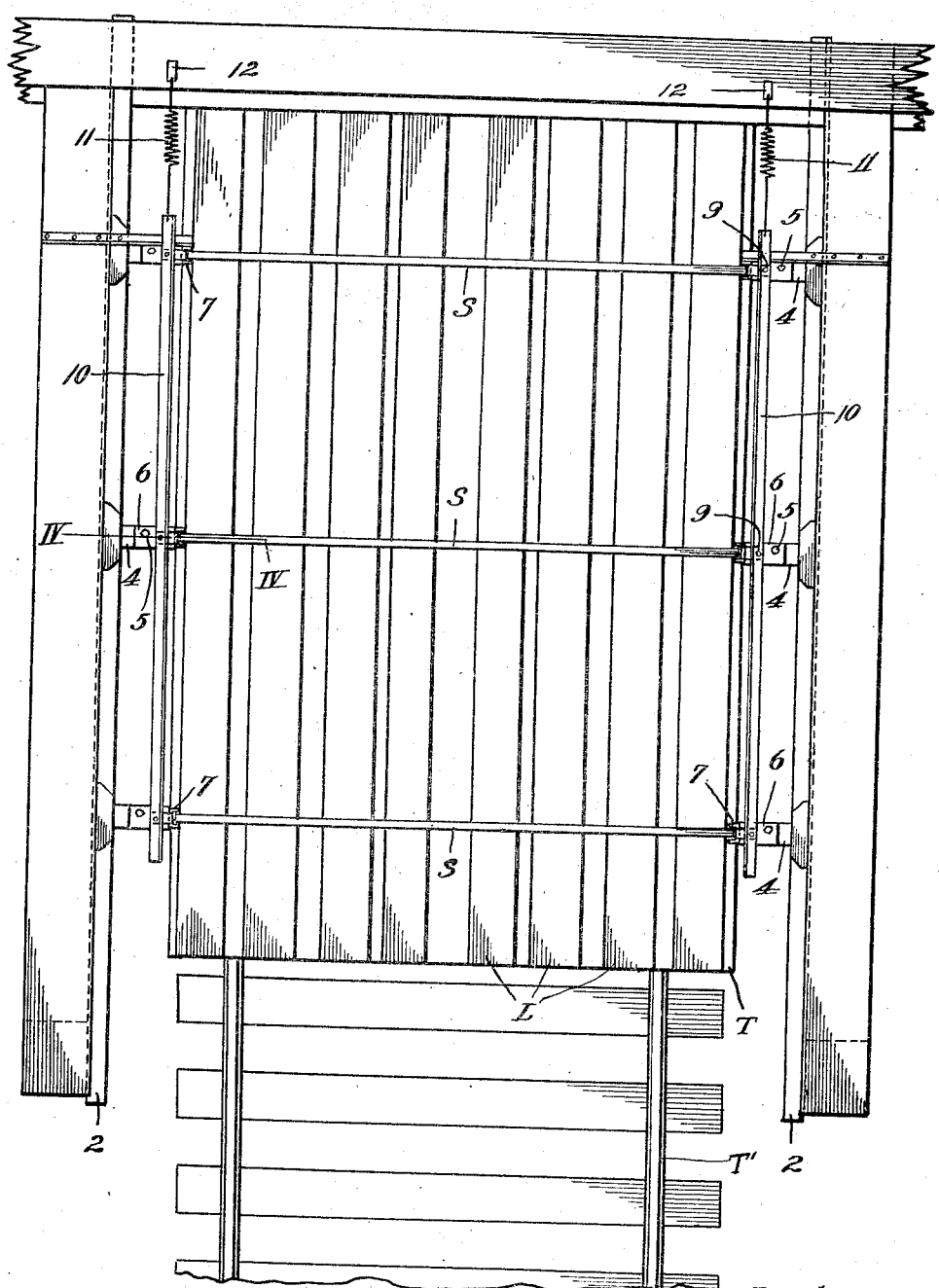
Figure 2 is a top plan view of the same.

In the said drawings, where like reference characters identify corresponding parts, 1 and 2 respectively represent suitable lower and upper sets of horizontal supports arranged in pairs spaced apart a sufficient distance to accommodate the width of a lumber truck T, used in conveying the lumber to a kiln, said horizontal supports being secured to vertical posts or standards 3 erected on the floor of a room.

Arranged in oppositely-facing vertically-alined pairs are L-shaped brackets 4, the pairs of brackets being secured to the horizontal supports at any desirable distance apart according to the length of the lumber to be handled. Pivoted on bolts 5 to each of the brackets 4 adjacent the edges thereof, as shown in Figure 3, are similar brackets 6, and rigidly secured to each pair of vertically alined brackets 6 are channel iron guides 7 of such width as to accommodate the ends of the desired stick guides 8.

Secured to the upper end of each channel guide 7 is an arm 8, which is pivotally connected by a bolt 9 to a horizontal angle iron 10, it being understood that each set of channel guides on opposite sides of the truck will be similarly equipped. Connected to one end of each of said angle irons 10 is a retractile spring 11, which is connected at its opposite end to any suitable fixed support 12.

In the operation of the device, a wheeled truck T is run on a track T', between the guides 7 and a layer of lumber L is placed in position on the truck. Stick guides 8 are then fitted in and between each of the oppositely facing channel guides and upon the lumber, and then a second layer of lumber is positioned on the stick guides. This process is repeated until the truck is fully loaded. It will be apparent that as long as the truck remains in one position, each successive stick guide will be accurately placed in vertical alinement and, therefore, all of the lumber will be subjected to equal drying action without any tendency to twist and warp as would be true if the stick guides were not in vertical alinement.

The truck having been loaded, it is merely necessary to push the truck along to cause the channel guides 7 to turn or pivot on the bolts 5 (see dotted lines Figure 3), the angle irons 10 pivoting on the bolts 9, to permit the ends of the stick guides to be disengaged from position. Immediately the stick guides are disengaged the springs 11 will return the channel guides to position. It will, of course, be noted that in the travel of the truck, the projecting stick ends will trip or operate each successive channel guide against the resistance of springs 11, until the last stick has passed out from the loading position of the truck. The process can then be repeated, the sticks being available for use on another after the cured lumber is removed from the truck.

From the above description it will be evident that the automatic stick guide of the invention may be readily modified to accommodate all classes and sizes of lumber without departing from the principle of construction and mode of operation involved, and while I have described and claimed the preferred embodiment of the same, I reserve the right to make all changes properly falling within the spirit and scope of the appended claims.

I claim:

1. A stick guide for lumber comprising oppositely-facing pivoted guides for receiving the ends respectively of a series of sticks, and adapted under pressure of the sticks when moved laterally to swing outwardly beyond the ends of the sticks to permit the latter to pass from position.

2. A stick guide for lumber comprising oppositely-facing pivoted guides for receiving the ends respectively of a series of sticks, and adapted under pressure of the sticks when moved laterally to swing outwardly beyond the ends of the sticks to permit the latter to pass from position, and means for returning the guides to normal position.

3. A stick guide for lumber comprising oppositely-facing vertically extending channel guides pivoted for horizontal movement, and adapted to receive the opposite ends of a series of horizontal sticks, and retractile springs for resisting lateral movement of the sticks tending to pivotally operate the guides.

4. A stick guide for lumber comprising a series of oppositely-facing vertically extending pivoted channel guides adapted to receive the opposite ends of a vertical series of sticks, parallel bars adjacent the guides at each side, arms projecting from the parallel bars and pivotally supported outwardly thereof, and yielding means for resisting longitudinal movement of said bars and for returning them and the guides to normal position.

In witness whereof I hereunto affix my signature.

CHARLES A. HUFFMAN.